(12) United States Patent
Foster

(10) Patent No.: US 8,337,358 B2
(45) Date of Patent: Dec. 25, 2012

(54) HYDRAULIC CLUTCH CONTROL MECHANIZATION WITH ALL-MODE DEFAULT FOR USE IN A MULTIMODE HYBRID TRANSMISSION

(75) Inventor: Michael D. Foster, Carmel, IN (US)

(73) Assignee: GM Global Technology Operations LLC, Detroit, MI (US)

( * ) Notice: Subject to any disclaimer, the term of this patent is extended or adjusted under 35 U.S.C. 154(b) by 921 days.

(21) Appl. No.: 12/415,843

(22) Filed: Mar. 31, 2009

(65) Prior Publication Data

US 2009/0253551 A1 Oct. 8, 2009

Related U.S. Application Data

(60) Provisional application No. 61/042,402, filed on Apr. 4, 2008.

(51) Int. Cl.
*B60W 10/02* (2006.01)
(52) U.S. Cl. ............................................. 477/5; 477/131
(58) Field of Classification Search ................... 477/3, 5, 477/125, 127, 130, 131, 143, 906, 907; 701/62
See application file for complete search history.

(56) References Cited

U.S. PATENT DOCUMENTS

| | | | | |
|---|---|---|---|---|
| 6,520,881 | B1 * | 2/2003 | Long et al. | 475/119 |
| 7,322,899 | B1 * | 1/2008 | Long et al. | 475/116 |
| 7,338,401 | B2 * | 3/2008 | Klemen et al. | 475/5 |
| 7,470,209 | B2 * | 12/2008 | Holmes et al. | 477/3 |
| 2006/0154771 | A1 * | 7/2006 | Klemen et al. | 475/5 |

* cited by examiner

*Primary Examiner* — David D Le
*Assistant Examiner* — Huan Le
(74) *Attorney, Agent, or Firm* — Quinn Law Group, PLLC

(57) ABSTRACT

A transmission includes first, second, third, and fourth clutches, first and second shift valves, and first, second, third, and fourth trim valves. Each trim valve is operative to control fluid pressure to a respective one of the first, second, third, and fourth clutches. The transmission also includes a controller. The controller is electrically operatively connected to the first and second shift valves and the first, second, third, and fourth trim valves to selectively provide a first clutch configuration for operating in a first mode and a second clutch configuration for operating in a second mode. The transmission also includes a clutch control mechanization for selectively moving the clutch configuration to a default position in the event power to the transmission is lost.

19 Claims, 12 Drawing Sheets

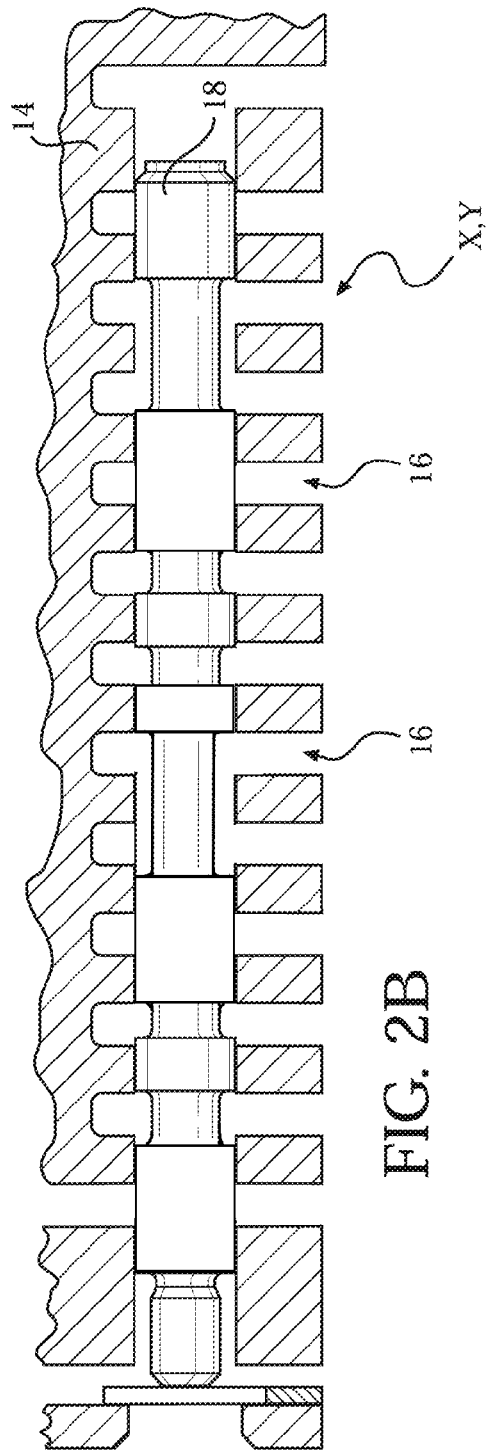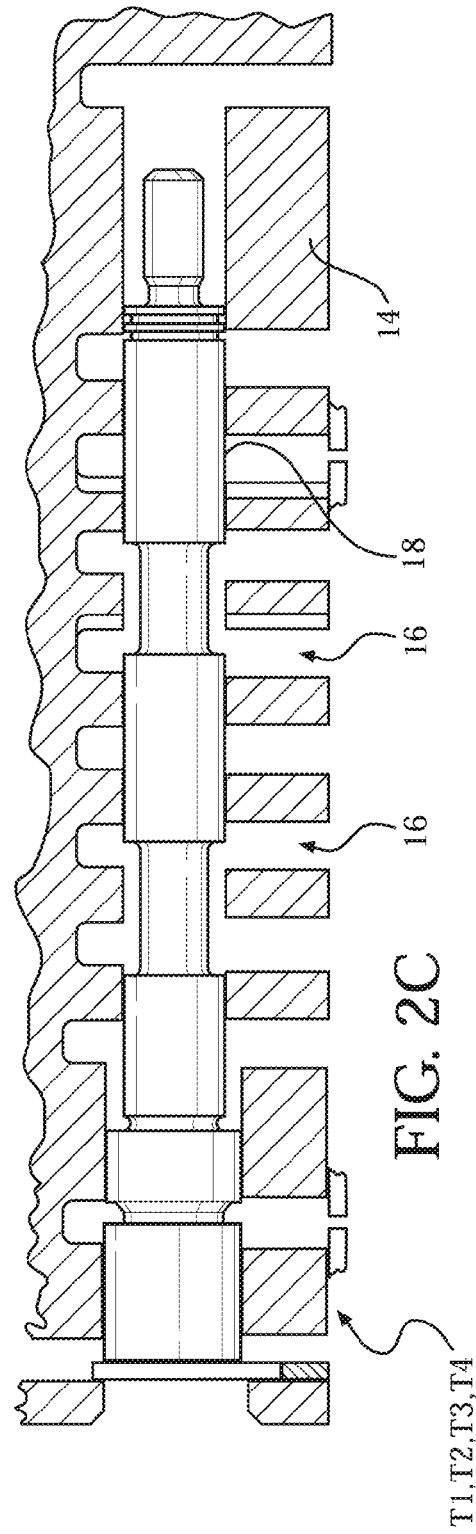

|  | C1 | C2 | C3 | C4 |
|---|---|---|---|---|
| (M1) EVT Mode 1 | Applied | Released | Applied | Released |
| (G1) Fixed Gear 1 | Applied | Released | Applied | Applied |
| (M2) EVT Mode 2 | Applied | Released | Released | Applied |
| (G2) Fixed Gear 2 | Applied | Applied | Released | Applied |
| (M3) EVT Mode 3 | Released | Applied | Released | Applied |
| (G3) Fixed Gear 3 | Released | Applied | Applied | Applied |
| (M4) EVT Mode 4 | Released | Applied | Applied | Released |

FIG. 3

| Available Ranges | Direct Main | NO1 | NO2 | NC1 | NC2 | X | Y |
|---|---|---|---|---|---|---|---|
| M1 | C3 | Blocked | C1 | Blocked | Blocked | 0 | 1 |
| M1/G1/M2/G2 | | C4 | C1 | C2 | C3 | 1 | 1 |
| M3/G3/M4 | | C4 | Blocked | C2 | C3 | 1 | 0 |
| M4 | C3 | Blocked | Blocked | C2 | Blocked | 0 | 0 |

FIG. 4A

| Available Ranges | Direct Main | NO1 | NO2 | NC1 | NC2 | X | Y |
|---|---|---|---|---|---|---|---|
| M1 | C3 | | C1 | | | 0 | 1 |
| M2 | | C4 | C1 | C2 | | 1 | 1 |
| M3 | | C4 | | C2 | | 1 | 0 |
| M4 | C3 | | | | | 0 | 0 |

FIG. 4B

HYDRAULIC CLUTCH CONTROL MECHANIZATION WITH ALL-MODE DEFAULT FOR USE IN A MULTIMODE HYBRID TRANSMISSION

CROSS-REFERENCE TO RELATED APPLICATIONS

This application claims the benefit of U.S. Provisional Application 61/042,402, filed Apr. 4, 2008, and which is hereby incorporated by reference in its entirety.

TECHNICAL FIELD

The present invention relates to a control system and method for multimode hybrid transmissions.

BACKGROUND OF THE INVENTION

In general, a motor vehicle transmission includes an input shaft and an output shaft. The input shaft is typically coupled to the vehicle engine through a fluid coupling such as a torque converter, and the output shaft is coupled to the vehicle drive wheels through a differential gear set. The transmission employs a number of gear elements and selectively engageable friction elements (referred to herein as clutches) that are controllable to vary the speed ratio between the transmission input and output shafts.

Transmissions are typically characterized by a plurality of fixed speed ratios. Each of the fixed speed ratios is achievable by engaging a particular combination of clutches. An electrically variable transmission includes at least one motor/generator, and is typically characterized by at least one electrically variable mode or range of operation in which the speed ratio between the input shaft and the output shaft is not fixed, but instead varies with the speed of the rotor of the motor/generator. An electrically variable transmission may be configured such that multiple electrically variable modes or ranges are achievable by engaging particular combinations of clutches. Other combinations of clutches in an electrically variable transmission may result in fixed speed ratio modes.

Shifting from a currently established fixed ratio or electrically variable mode to a new fixed ratio or electrically variable mode involves, in most cases, disengaging a clutch (off-going clutch) and engaging another clutch (on-coming clutch). Clutches may be engaged by the action of pressurized fluid against a piston in a clutch apply chamber. Accordingly, transmissions typically include a hydraulic circuit for supplying pressurized fluid to the apply chambers of the clutches.

SUMMARY OF THE INVENTION

A multi-mode hybrid transmission includes first, second, third and fourth clutches; first and second shift valves; and first, second, third, and fourth trim valves. Each of the shift valves and the trim valves are configured to control fluid pressure to a respective one of the first, second, third, and fourth clutches. An electronic control unit (ECU) is electrically operatively connected to each of the shift valves and the trim valves. The ECU is configured to selectively engage a plurality of the clutches and provide a clutch configuration to operate in at least one of an electronic variable transmission (EVT) mode and a fixed gear mode. A hydraulic control unit (HYD) provides fluid to each of the shift valves and the trim valves to maintain the clutch configuration in the EVT mode when the electrical operative connection to the ECU is off. Alternatively, the HYD provides fluid to each of the shift valves and the trim valves to move the clutch configuration from the fixed gear mode to the EVT mode when the electrical operative connection to the ECU is off.

In another aspect of the invention, a multi-mode hybrid transmission includes an input member, an output member, and at least one electric motor. The transmission also includes first, second, third and fourth clutches that are engageable in response to fluid pressure. The clutches are engageable in various combinations to provide at least four electronically variable transmission (EVT) modes of operation in which the speed ratio between the input member and the output member is dependent upon the speed of the at least one electric motor and a plurality of fixed gear modes of operation in which the speed ration between the input member and the output member is fixed. The transmission also includes a plurality of fluid passages; first and second shift valves; and first, second, third, and fourth trims valves. Each of the shift valves and the trim valves are configured to control fluid pressure to a respective one of the first, second, third, and fourth clutches via the plurality of fluid passages. An electronic control unit (ECU) is electrically operatively connected to each of the shift valves and the trim valves to selectively engage a plurality of the clutches and provide a clutch configuration to operate in at least one of an electronic variable transmission (EVT) mode and a fixed gear mode. A hydraulic control unit (HYD) provides fluid to each of the shift valves and the trim valves via at least one of the plurality of fluid passages to maintain the clutch configuration in the EVT mode when the electrical operative connection to the ECU is off. Alternatively, the HYD provides fluid to each of the shift valves and the trim valves via at least one of the plurality of fluid passages to move the clutch configuration from the fixed gear mode to the EVT mode when the electrical operative connection the ECU is off.

Another aspect of the invention includes a powertrain for a hybrid vehicle. The powertrain includes an engine, a final drive, a multi-mode hybrid transmission, and a control system. The multi-mode hybrid transmission includes an input member, and output member, and at least one electric motor. The input member is operatively connected to the engine and the output member is operatively connected to the final drive. The transmission also includes first, second, third and fourth clutches that are engageable in response to fluid pressure. The clutches are engageable in various combinations to provide at least four electronically variable transmission (EVT) modes of operation in which the speed ratio between the input member and the output member is dependent upon the speed of the at least one electric motor and a plurality of fixed gear modes of operation in which the speed ration between the input member and the output member is fixed. The transmission also includes first and second shift valves and first, second, third, and fourth trim valves. Each of the shift valves and the trim valves are configured to control fluid pressure to a respective one of the first, second, third, and fourth clutches. The control system includes an electronic control unit (ECU) and a hydraulic control unit (HYD). The ECU is electrically operatively connected to each of the shift valves and the trim valves to selectively engage a plurality of the clutches and provide a clutch configuration to operate in at least one of an electronic variable transmission (EVT) mode and a fixed gear mode. The HYD provides fluid to each of the shift valves and the trim valves via at least one of the plurality of fluid passages to maintain the clutch configuration in the EVT mode when the electrical operative connection to the ECU is off. Alternatively, the HYD provides fluid to each of the shift valves and the trim valves via at least one of the plurality of fluid passages to move the clutch configuration from the fixed gear mode to the EVT mode when the electrical operative connection to the ECU is off.

The above features and advantages and other features and advantages of the present invention are readily apparent from the following detailed description of the best modes for carrying out the invention when taken in connection with the accompanying drawings.

BRIEF DESCRIPTION OF THE DRAWINGS

Referring now to the figures, which are exemplary embodiments and wherein like elements are numbered alike:

FIG. 2B is a cross sectional side view of a shift valve of the control system of FIG. 2A;

FIG. 2C is a cross sectional side view of a trim valve of the control system of FIG. 2A;

FIG. 3 is a chart depicting clutch usage for different operating modes of the transmission of FIG. 1;

FIG. 4A is a chart depicting the clutches available for different operating modes of the transmission of FIG. 1;

FIG. 4B is a chart depicting the default clutches available for different operating modes of the transmission of FIG. 1;

DESCRIPTION OF THE PREFERRED EMBODIMENTS

Figure 1:
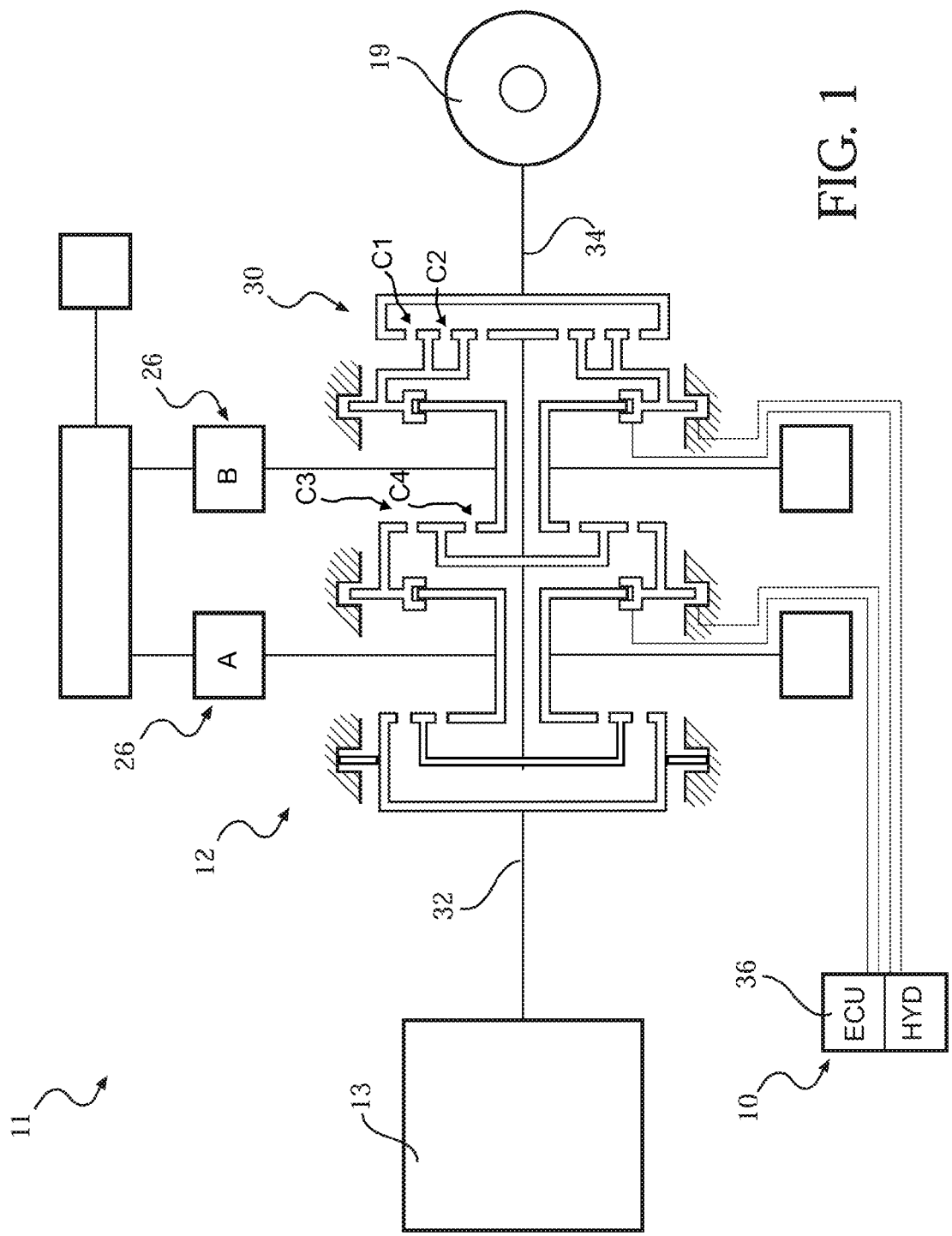
FIG. 1 is a schematic view of a powertrain for a hybrid vehicle, including an engine, a multimode hybrid transmission having clutches and electric motors, an electro-hydraulic control system, and a final drive.

Referring to the drawings, wherein like reference numbers refer to like components, FIG. 1 shows a powertrain 11 for a hybrid vehicle (not shown), including an engine 13, a multimode hybrid transmission 12, an electro-hydraulic control system 10, and a final drive 19. The hybrid transmission 12 may include four clutches C1, C2, C3, and C4 and two electric motors A and B (also commonly shown as 26 in FIGS. 1 and 2A). However, it should be appreciated that the invention is not limited to a set number of clutches C1-C4 and/or electric motors A, B, as other quantities known to those skilled in the art may also be used.

Figure 2A:
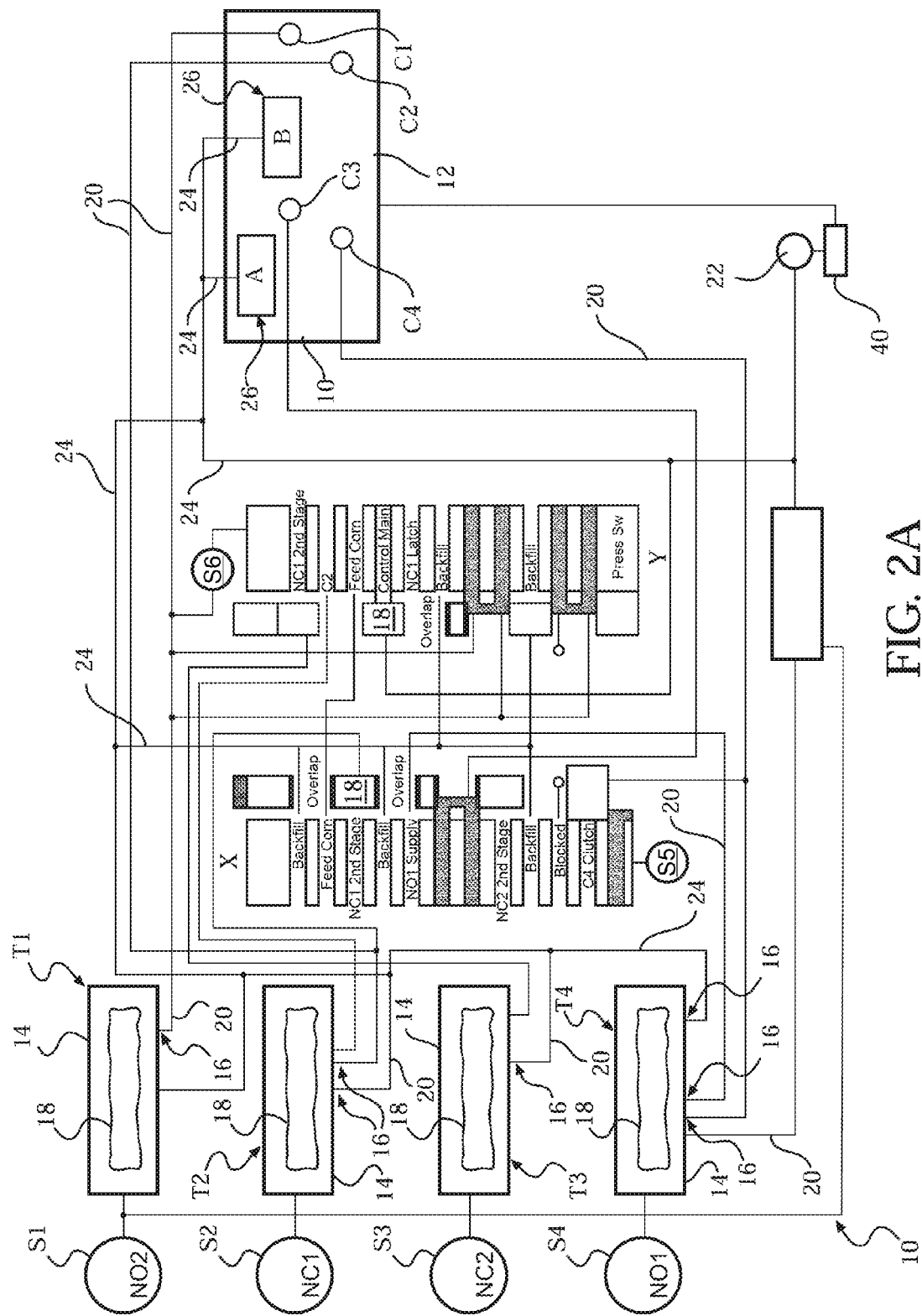
FIG. 2A is partial schematic view of the electro-hydraulic control system of FIG. 1, including an X shift valve and a Y shift valve.

Referring to FIG. 2A, the control system 10 includes four trim valves T1, T2, T3, and T4 and two shift valves X and Y. FIG. 2B shows a shift valve X and Y and FIG. 2C shows a trim valve T1, T2, T3, and T4. The trim valves T1, T2, T3, and T4 and two shift valves X and Y each include a respective valve body 14 that defines a plurality of ports 16. A valve member 18 is slidably disposed within each of the respective valve bodies 14. The valve members are configured for regulating the flow of fluid into and out of the ports 16 of the respective trim valves T1, T2, T3, T4 and shift valves X and Y. The valve member 18 is slidable within the valve body 14 between a stroked and an unstroked position. The valve bodies 14 of each of the trim valves T1, T2, T3, and T4 and the two shift valves X and Y are in fluid communication with the clutches C1, C2, C3, and C4 of the transmission 12 via an interconnected network of fluid passages 20. The fluid passages 20 are configured for moving hydraulic fluid, oil, etc. through the control system 10 and the transmission 12. The fluid passages 20 are connected to the various ports 16 to provide the fluid communication within the valve body 14. Therefore, some of the fluid passages 20 interconnect some of the trim valve T1, T2, T3, and T4 and/or shift valve X and Y to one another. Others of the fluid passages 20 connect some of the trim valve T1, T2, T3, and T4 with the clutches C1, C2, C3, and C4.

In addition, the control system 10 includes a plurality of solenoids S1, S2, S3, S4, S5, and S6 configured for controlling the trim valves T1, T2, T3, and T4 and the two shift valves X and Y. The solenoids S1, S2, S3, S4, S5, and S6 are configured such that each solenoid S1, S2, S3, S4, S5, and S6 is dedicated to a respective first, second, third, and fourth trim valve T1, T2, T3, and T4 or first and second shift valves X and Y. This means that the solenoids S1, S2, S3, S4, S5, and S6 move the valve member 18 within the valve body 14 of the trim valve T1, T2, T3, and T4 and/or shift valve X and Y between a stroked position and an unstroked position. Movement of the valve member 18 within the valve body 14 regulates the fluid entering and exiting the ports 16 of the respective trim valve T1, T2, T3, and T4 and/or shift valve X and Y.

The fluid is moved through the fluid passages 20, the trim valves T1, T2, T3, and T4, the shift valves X and Y, the transmission 12, etc. via a pump 22. The pump 22 may be transmission pump, auxiliary pump, etc. A plurality of backfill passages 24 extend from the ports 16 of the trim valves T1, T2, T3, and T4 and the shift valves X and Y to interconnect the trim valves T1, T2, T3, and T4 and the shift valves X and Y with the transmission 12. The fluid flows within the backfill passages 24 at a generally low pressure. The backfill passages 24 extend to each of the motors A and B for cooling the motors A and B during operation. Similar to the fluid passages, the backfill passages 24 interconnect some of the trim valve T1, T2, T3, and T4 and/or shift valve X and Y to the motors A and B.

The transmission 12 functions by "shifting" or engaging different combinations of the clutches C1, C2, C3, and C4 to vary an output torque on the final drive 19. The control system 10 controls when and which of the clutches C1, C2, C3, and C4 are engaged or disengaged. The transmission 12 can operate in four different electronic variable transmission (EVT) modes, i.e., EVT mode 1 (M1), EVT mode 2 (M2), EVT mode 3 (M3), and EVT mode 4 (M4), and three different fixed gear modes, i.e., fixed gear 1 (G1), fixed gear 2 (G2), fixed gear 3 (G3), as shown in FIGS. 3 and 4A. The control system 10 uses a hydraulic clutch control strategy, as depicted in FIGS. 5A-11B, for shifting between these seven modes M1-M3 and G1-G3. The planetary gear arrangement 30, as shown in FIG. 1, provides four forward speed ratios or EVT Modes M1-M4 between an input shaft 32 and an output shaft 34. In EVT mode 1 M1, the clutches C1 and C3 are engaged. In EVT mode 2 M2, the clutches C1 and C4 are engaged. In EVT mode 3 M3, the clutches C2 and C4 are engaged. In EVT mode 4 M4, the clutches C2 and C3 are engaged. In fixed gear 1 G1, the clutches C1, C3, and C4 are applied. In fixed gear 2 G2, clutches C1, C2, and C4 are applied. In fixed gear 3 G3, clutches C2, C3, and C4 are applied.

The control system 10 includes an electronic control unit (ECU) 36 or controller, for operating an electrical portion of the control system 10, and a hydraulic control unit (HYD), for operating a hydraulic portion of the control system 10. The ECU incorporates a conventional digital computer that is programmable to provide electrical signals to the hydraulic portion of the control system to establish the engagement and disengagement of the clutches C1, C2, C3, and C4. FIG. 2A shows the control system 10 in greater detail. The hydraulic portion of the control system includes the hydraulic pump 22, such as a variable volume type pump, that draws fluid from a reservoir 40 for delivery of the fluid to the fluid passages 20 and the trim valves T1, T2, T3, and T4, and the shift valves X and Y.

The electrical portion of the control system 10, or controller, includes the solenoids S1, S2, S3, S4, S5, and S6 which receive an electronic signal to selectively move the valve member 18 within the valve body 14 of at least one of the trim valves T1, T2, T3, and T4 and/or at least one of the shift valves X and Y between the stroked position and the unstroked position. This means that the fluid does not go through all of the ports 16 of all of the trim valves T1, T2, T3, and T4 and shift valve X and Y at the same time. As the valve member 18 moves within the valve body 14, some ports 16, and the corresponding passages 20, are blocked to prevent flow of the fluid, while other ports 16, and the corresponding passages 20, are opened to allow flow of the fluid from one passage 20 into an adjacent passage 20.

In the event power to the ECU 36 is lost, the control system 10 includes a clutch control mechanization, as shown in FIGS. 4A and 4B, via the HYD. The clutch control mechanization provides a hydraulic default to a current operating mode of the transmission 12, if the transmission 12 is operating in one of the four EVT modes M1-M4, or provides a default to the next lowest EVT mode M1-M3 if the transmission 12 is operating in one of the three fixed gear modes G1-G3. In addition, the control system 10 provides operating modes that prevent, or "lock out", undesired shift sequencing and engagement of clutches C1, C2, C3 and/or C4 of the transmission 12.

Figure 5B:
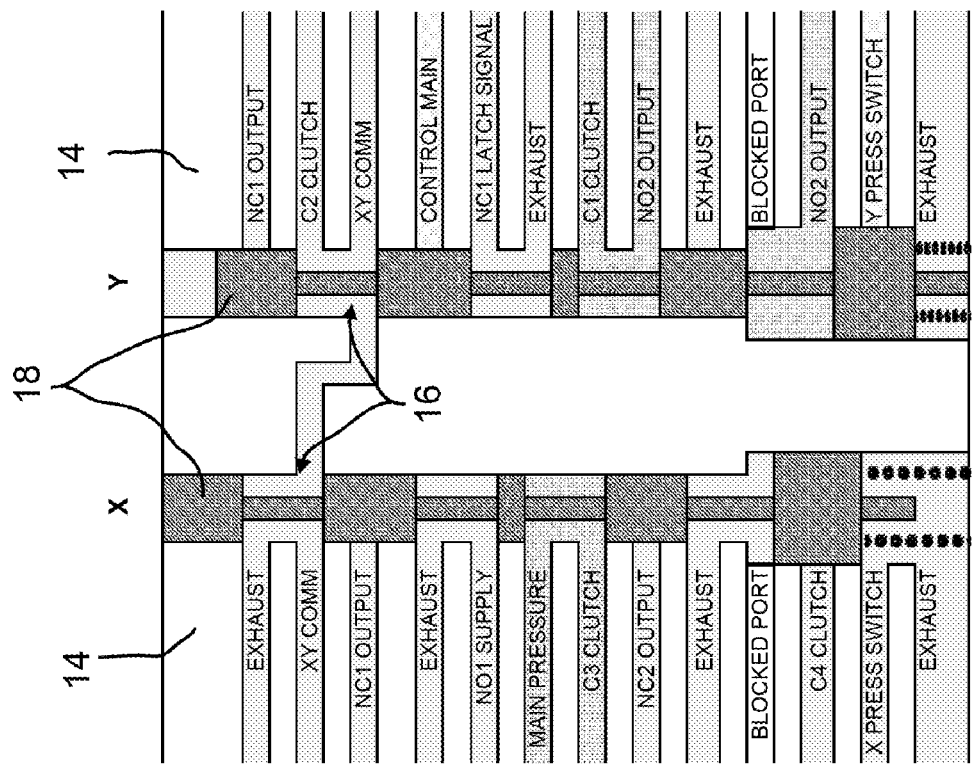
FIG. 5B is a schematic representation of the default position of the transmission of FIG. 5A in a power off state.
Figure 5A:
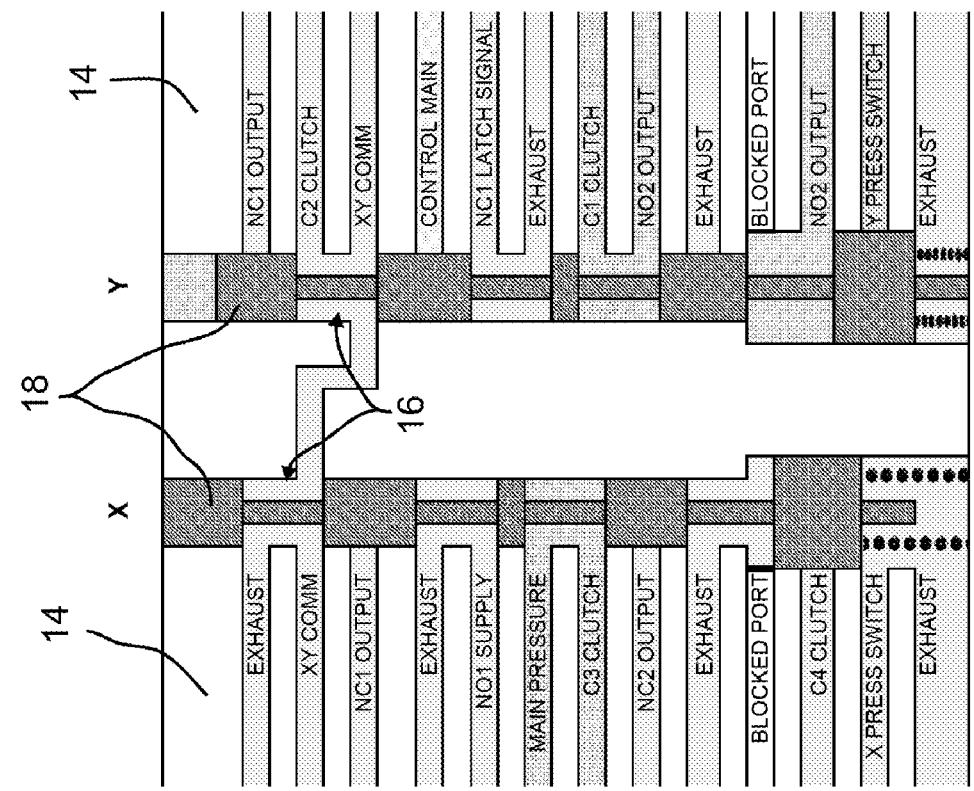
FIG. 5A is a schematic representation for mode 1 of the transmission in a powered state and representing the X shift valve in an unstroked state and the Y shift valve in a stroked state.

There are four logic combinations of the two valves X and Y that provide four operating zones, i.e., M1, M1/G1/M2/G2, M3/G3/M4, and M4, as shown in FIGS. 3, 4A, and 4B. In the first logic combination, the shift valve X is destroked and the shift valve Y is stroked, as shown in FIGS. 5A and 5B. In the second logic combination, shift valves X and Y are both stroked, as shown in FIGS. 6A-8B. In the third logic combination, the shift valve X is stroked and the shift valve Y is destroked, as shown in FIGS. 9A-10B. In the fourth logic combination, shift valves X and Y are destroked, as shown in FIGS. 11A and 11B. Therefore, the M1 operating zone is achieved when the first logic combination is attained, the M1/G1/M2/G2, i.e., "All Available", operating zone is achieved when the second logic combination is attained, the M3/G3/M4 operating zone is achieved when the third logic combination is attained, and the M4 operating zone is achieved when the fourth logic combination is attained.

In the event of power loss to the transmission controller, a combination of solenoids S1, S2, S3, S4, S5, and S6, clutches C1, C2, C3, and C4, and latching of the shift valves X and Y, allows the transmission 12 to latch in the current operating mode M1-M4 or next lower mode M1-M3, if driving in a fixed gear G1-G3. For example, referring to FIGS. 3, 4A, and 4B, if the transmission 12 is operating in fixed gear 2 G2 (see FIG. 8A) and the power loss occurs, the transmission 12 will latch in EVT mode 2 M2 (see FIG. 8B), the next lowest mode. As another example, if the transmission 12 is operating in EVT mode 2 M2 (see FIG. 7A) and the power loss occurs, the transmission 12 will latch in EVT Mode 2 M2 (see FIG. 7B). Therefore, controlling the mechanization provides the ability to safely operate a multi-mode hybrid transmission 12 which has four EVT modes M1-M4 and three fixed gear modes G1-G3. Safe operating zones M1, M1/G1/M2/G2, M3/G3/M4, and M4 are provided to prevent unintended mode-mode, mode-gear, and gear-gear shifts, as well as providing the ability to latch in the current operating mode M1-M4 during power off conditions at the transmission controller.

Movement of the fluid into and out of the trim valves T1, T2, T3, and T4 and/or the shift valve X and Y between a stroked position and an unstroked position results in the controlled engagement or disengagement of the various clutches C1, C2, C3, and C4. Referring specifically to FIGS. 5A, 6A, 7A, 8A, 9A, 10A, and 11A, a shifting sequence occurs for engaging and disengaging the various clutches C1, C2, C3, and C4. This means that the shifting starts with the arrangement shown in FIG. 5A and the sequence of engagements and disengagements of the clutches C1, C2, C3, and C4 progresses respectively through FIGS. 5A, 6A, 7A, 8A, 9A, 10A, and 11A. Referring specifically to FIGS. 5B, 6B, 7B, 8B, 9B, 10B, and 11B, the transmission 12 defaults to the current operating mode, as shown. Therefore, FIGS. 5A-11B represent the shift valves X and Y, including the valve housing 14 with the ports 16 and a position of the valve member 18, relative to the ports 16 for allowing flow of the fluid into, out of, and between the ports 16.

Referring specifically to FIG. 5A, when the transmission 12 is operating in EVT mode 1 M1 with the shift valve X destroked and the shift valve Y stroked and power to the transmission 12 is lost, the transmission 12 defaults to the arrangement depicted in FIG. 5B, the current operating EVT mode, i.e., EVT mode 1 M1.

Figure 6B:
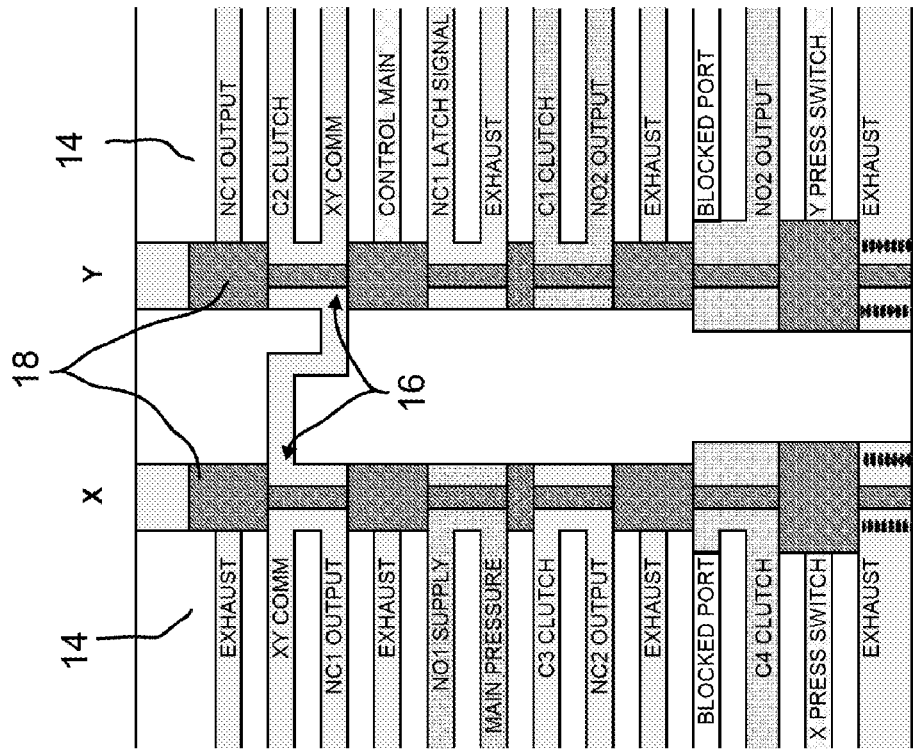
FIG. 6B is a schematic representation of the default position of the transmission of FIG. 6A in a power off state.
Figure 6A:
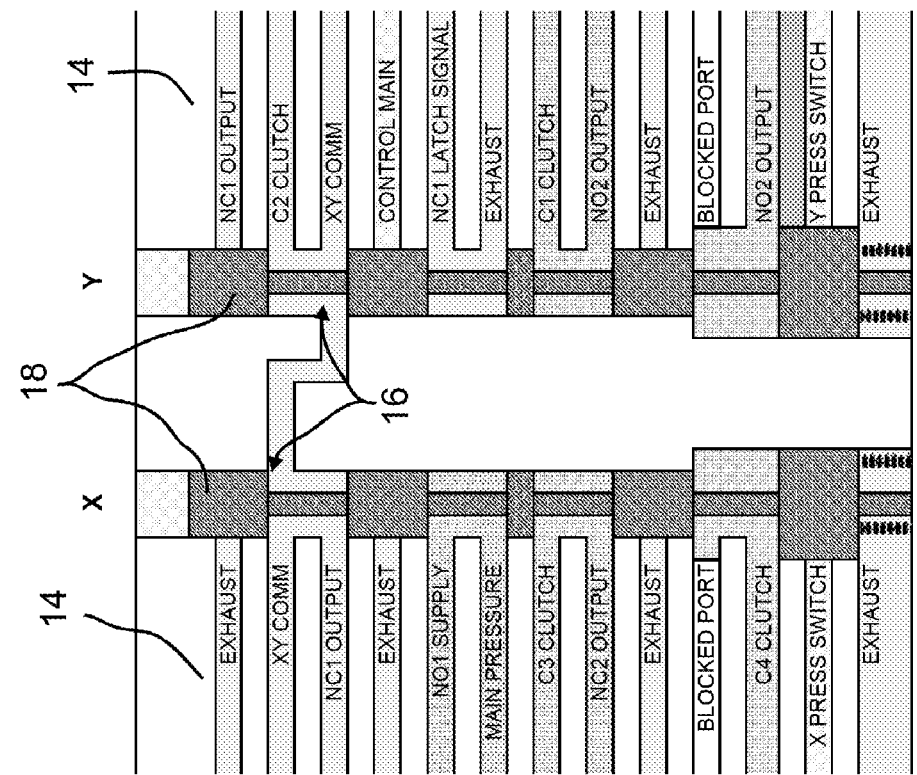
FIG. 6A is a schematic representation for gear 1 of the transmission in a powered state and representing the X and Y shift valves in a stroked state.

Referring specifically to FIG. 6A, when the transmission 12 is operating in fixed gear 1, the shift valves X and Y are stroked. If power to the transmission 12 is lost, the transmission 12 defaults to the arrangement depicted in FIG. 6B, the next lowest operating EVT mode, EVT mode 2 M2.

Figure 7B:
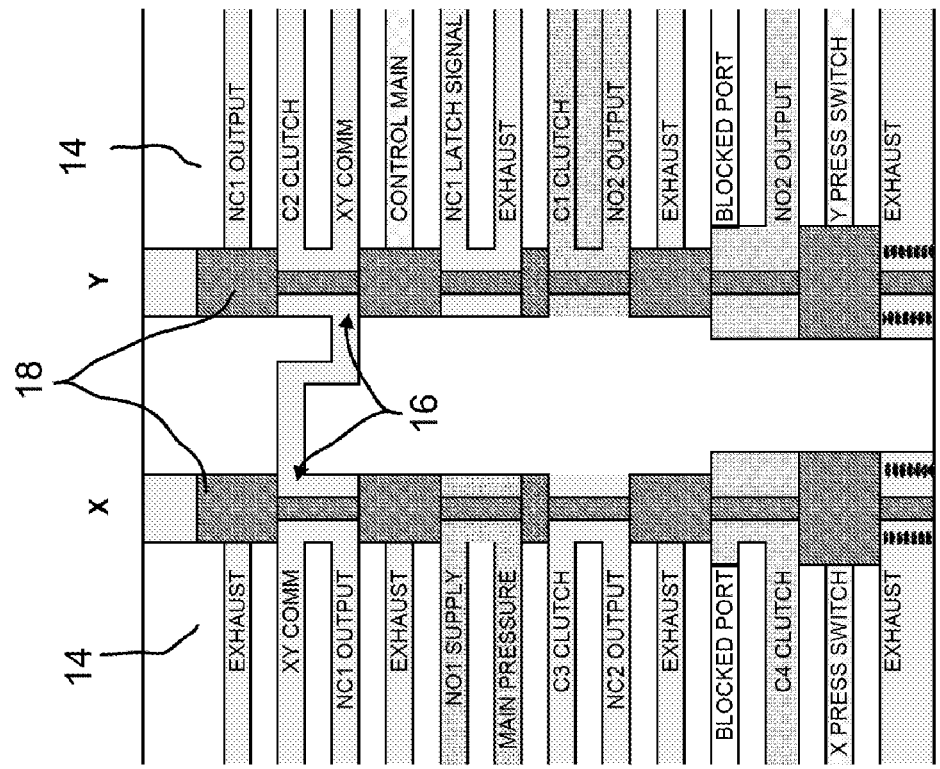
FIG. 7B is a schematic representation of the default position of the transmission of FIG. 7A in a power off state.
Figure 7A:
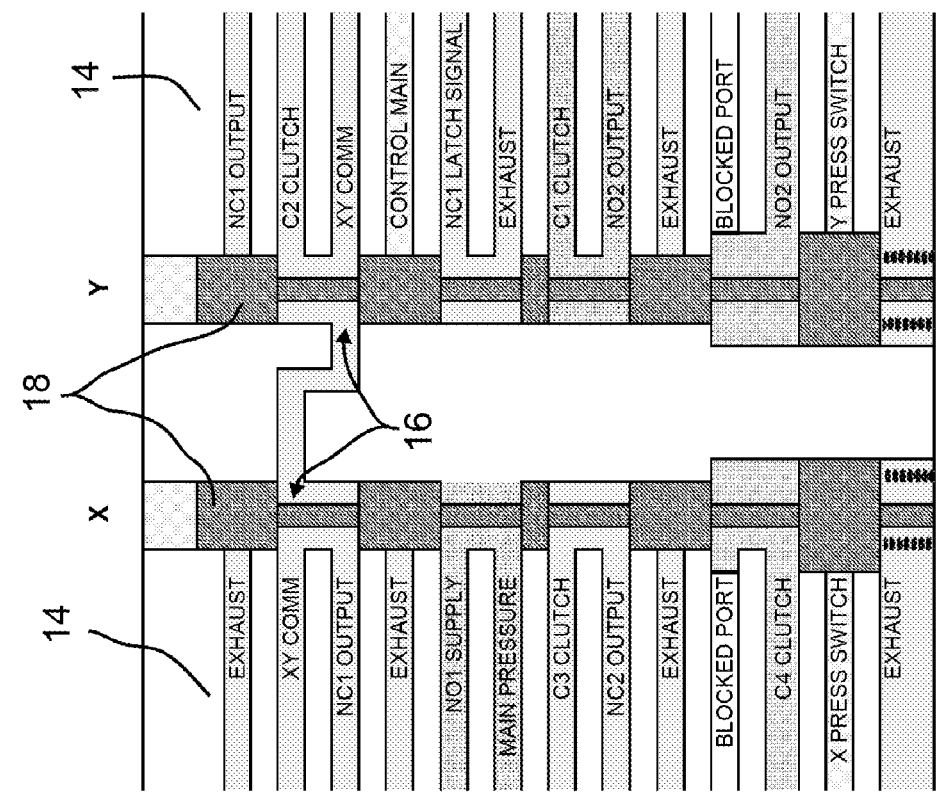
FIG. 7A is a schematic representation for mode 2 of the transmission in a powered state and representing the X and Y shift valves in a stroked state.

Referring specifically to FIG. 7A, when the transmission 12 is operating in EVT mode 2 M2, the shift valves X and Y are stroked. If power to the transmission 12 is lost, the transmission 12 defaults to the arrangement depicted in FIG. 7B, the operating EVT mode, i.e., EVT mode 2 M2.

Figure 8B:
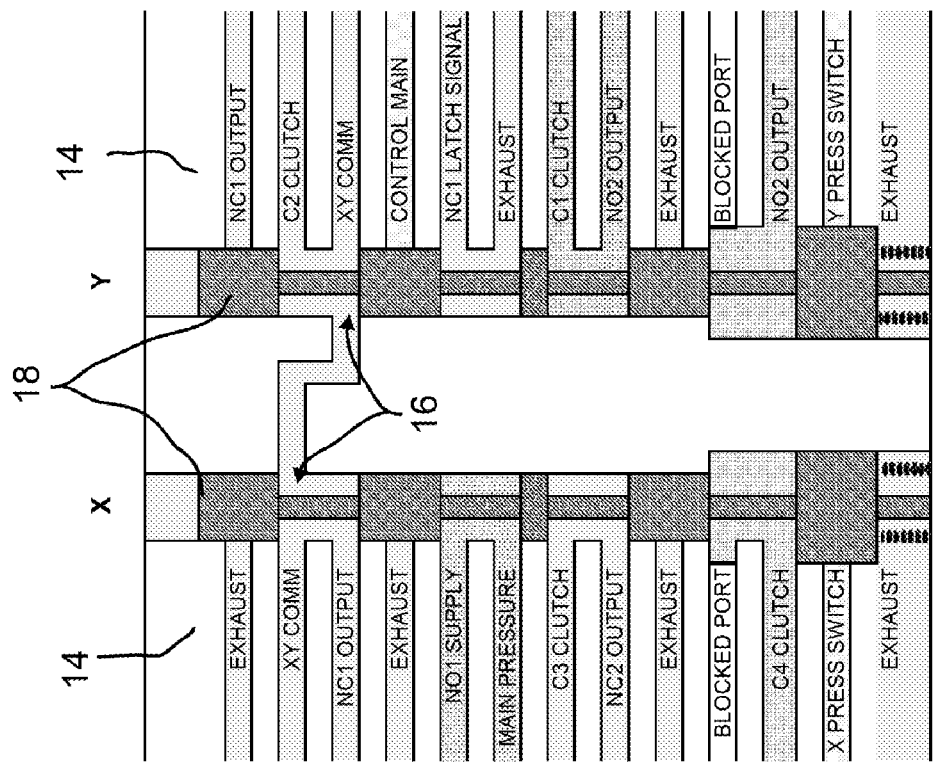
FIG. 8B is a schematic representation of the default position of the transmission of FIG. 8A in a power off state.
Figure 8A:
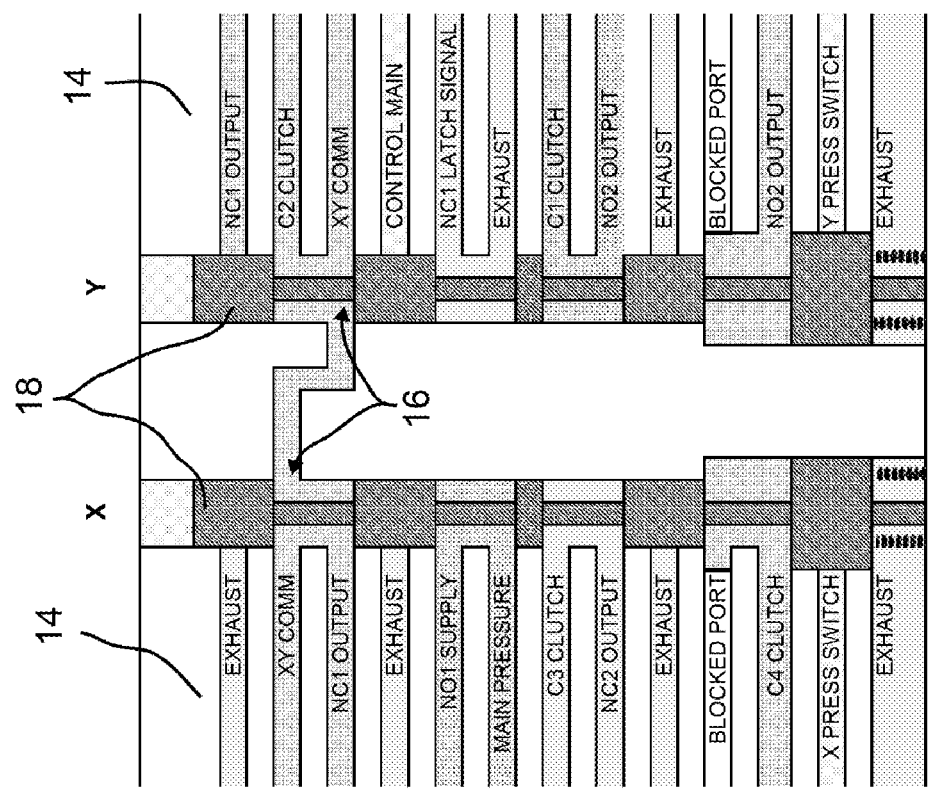
FIG. 8A is a schematic representation for gear 2 of the transmission in a powered state and representing the X and Y shift valves in a stroked state.

Referring specifically to FIG. 8A, when the transmission 12 is operating in fixed gear 2 G2, the shift valves X and Y are stroked. If power to the transmission 12 is lost, the transmission 12 defaults to the arrangement depicted in FIG. 8B, the next lowest operating EVT mode, EVT mode 2 M2.

Figure 9B:
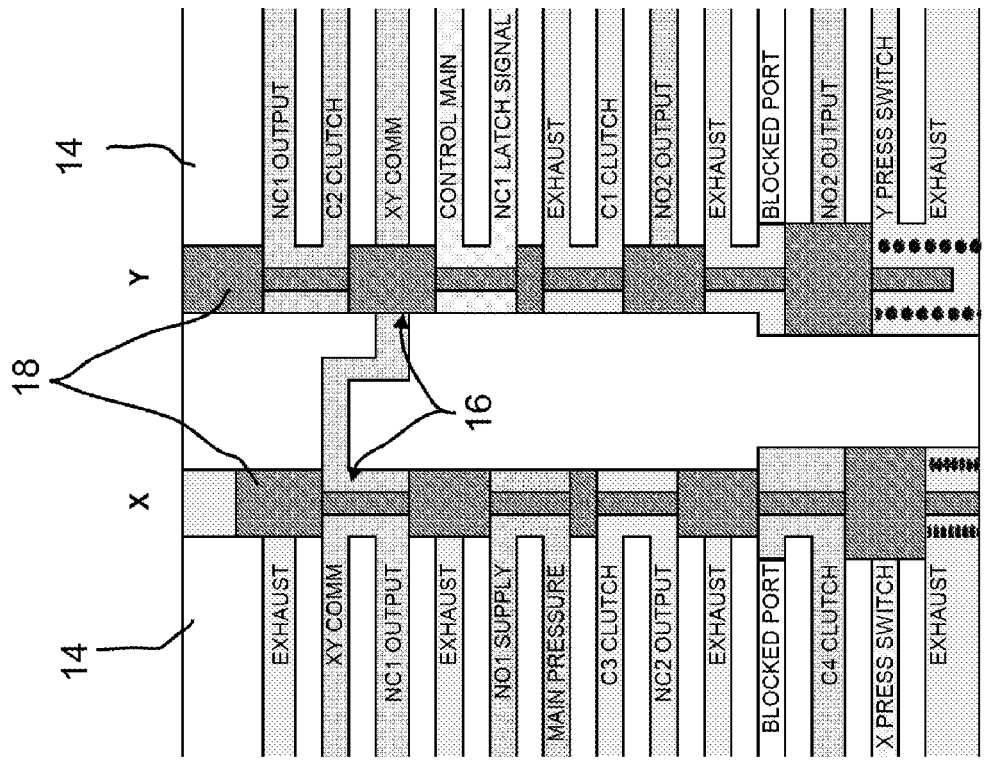
FIG. 9B is a schematic representation of the default position of the transmission of FIG. 9A in a power off state.
Figure 9A:
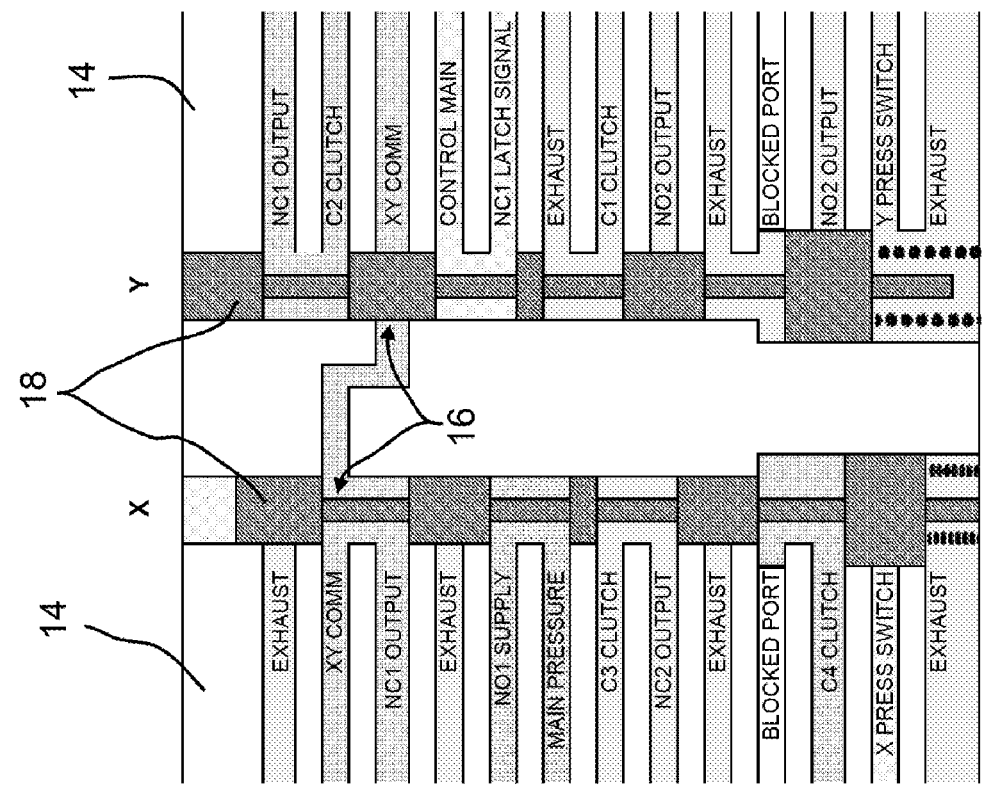
FIG. 9A is a schematic representation for mode 3 of the transmission in a powered state and representing the X shift valve in a stroked state and the Y shift valve in an unstroked state.

Referring specifically to FIG. 9A, when the transmission 12 is operating in EVT mode 3 M3, the shift valve X is stroked and the shift valve Y is destroked. If power to the transmission 12 is lost, the transmission 12 defaults to the arrangement depicted in FIG. 9B, the current operating EVT mode, EVT mode 3 M3.

Figure 10B:
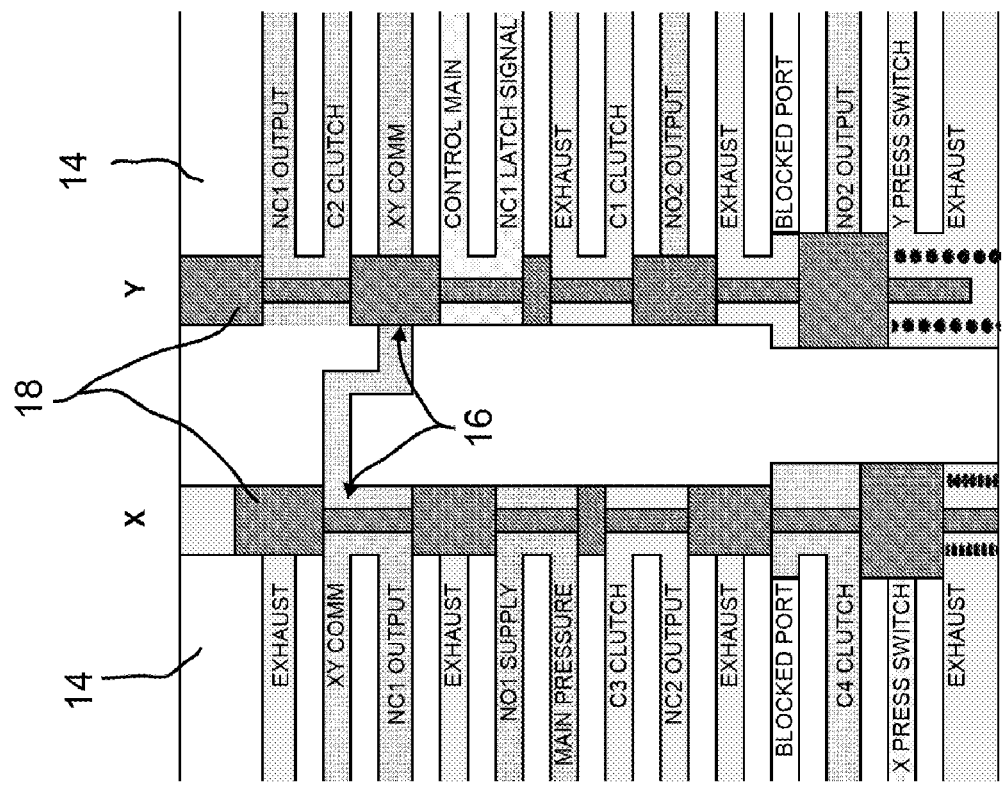
FIG. 10B is a schematic representation of the default position of the transmission of FIG. 10A in a power off state.
Figure 10A:
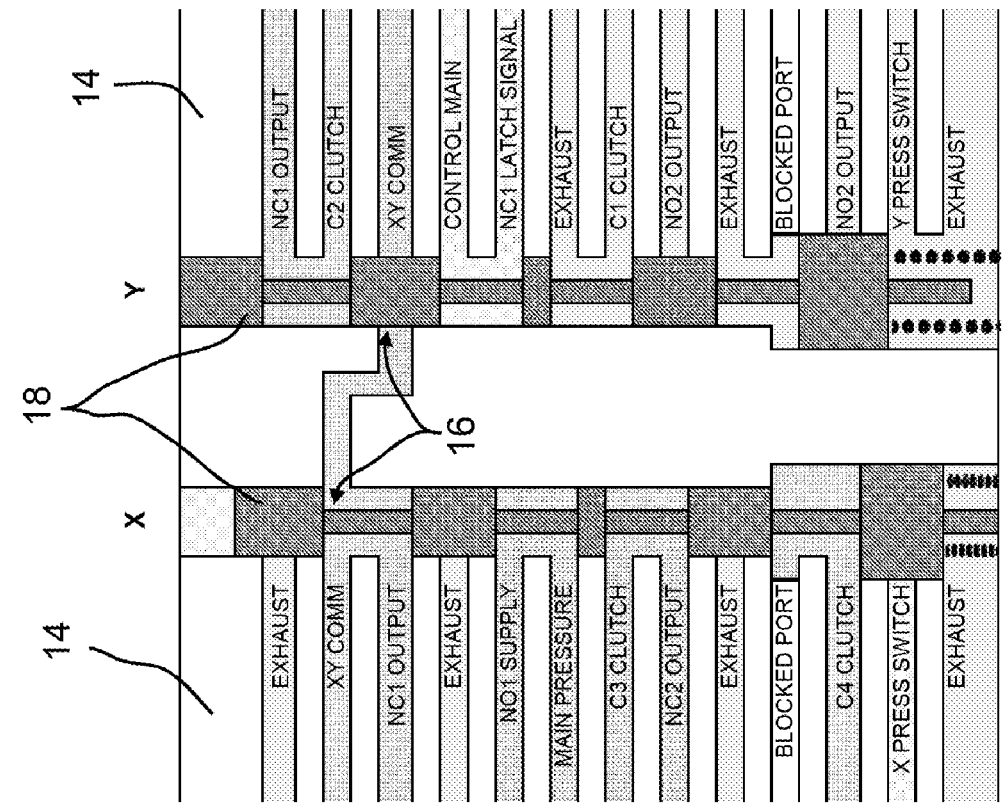
FIG. 10A is a schematic representation for gear 3 of the transmission in a powered state and representing the X shift valve in a stroked state and the Y shift valve in an unstroked state.
Figure 11A:
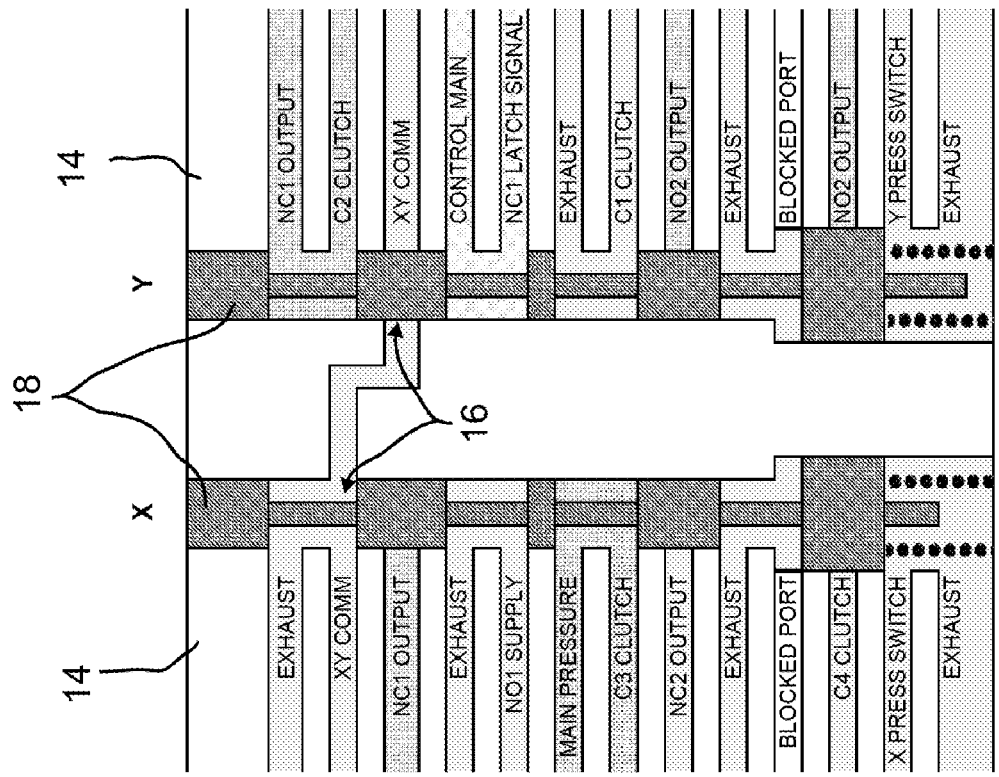
FIG. 11A is a schematic representation for mode 4 of the transmission in a powered state and representing the X and Y shift valves in an unstroked state.
Figure 11B:
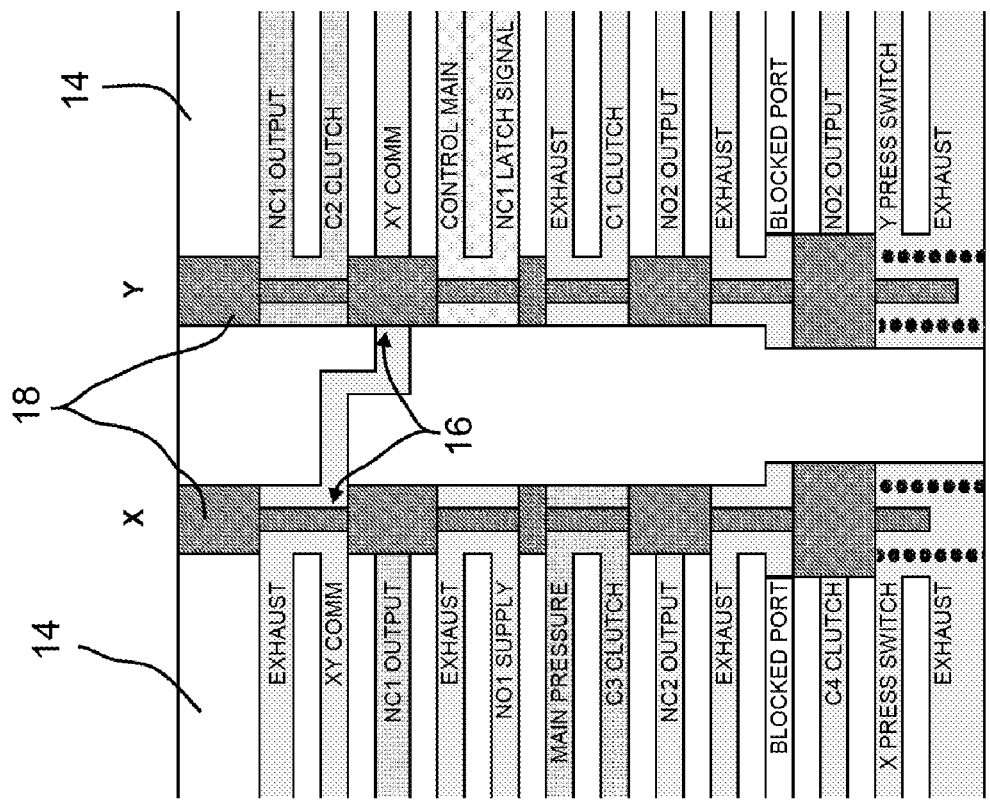
FIG. 11B is a schematic representation of the default position of the transmission of FIG. 11A in a power off state.

Referring specifically to FIG. 10A, when the transmission 12 is operating in fixed gear 3 G3, the shift valve X is stroked and the shift valve Y is destroked. If power to the transmission 12 is lost, the transmission 12 defaults to the arrangement depicted in FIG. 10B, the next lowest operating EVT mode, EVT mode 3 M3.

Referring specifically to FIG. 11A, when the transmission 12 is operating in EVT mode 4 M4, the shift valves X and Y are destroked. If power to the transmission 12 is lost, the transmission 12 defaults to the arrangement depicted in FIG. 11B, the current operating EVT mode, EVT mode 4 M4.

While the best modes for carrying out the invention have been described in detail, those familiar with the art to which this invention relates will recognize various alternative designs and embodiments for practicing the invention within the scope of the appended claims.

The invention claimed is:

1. A multi-mode hybrid transmission comprising:
an input member;
an output member;
an electric motor;
first, second, third and fourth clutches;
first and second shift valves;
first, second, third, and fourth trim valves;
wherein each of said shift valves and said trim valves are configured to control fluid pressure to a respective one of said first, second, third, and fourth clutches;
an electronic control unit (ECU) electrically operatively connected to each of said shift valves and said trim valves to selectively engage in combinations of at least two of said first, second, third, and fourth clutches and provide a clutch configuration to operate in at least one of a first electronic variable transmission (EVT) mode, a second EVT mode, a third EVT mode, a fourth EVT mode, a first fixed gear mode, a second fixed gear mode, and a third fixed gear mode, in which the speed ratio between the input member and the output member is dependent upon the speed of said at least one electric motor; and
a hydraulic control unit (HYD);
wherein said first clutch and said third clutch are engaged in said first EVT mode;
wherein said first clutch and said fourth clutch are engaged in said second EVT mode;
wherein said second clutch and said fourth clutch are engaged in said third EVT mode;
wherein said second clutch and said third clutch are engaged in said fourth EVT mode;
wherein said first clutch, said third clutch, and said fourth clutch are engaged in said first fixed gear mode;
wherein said first clutch, said second clutch, and said fourth clutch are engaged in said second fixed gear mode;
wherein said second clutch, said third clutch, and said fourth clutch are engaged in said third fixed gear mode;
wherein said HYD provides fluid to each of said shift valves and said trim valves to maintain said clutch configuration in one of said EVT modes when said electrical operative connection to said ECU is off;
wherein said HYD provides fluid to each of said shift valves and said trim valves to move said clutch configuration from one of said fixed gear modes to a next lowest one of said EVT modes when said electrical operative connection to said ECU is off.

2. A multi-mode hybrid transmission, as set forth in claim 1, wherein said HYD provides fluid to each of said shift valves and said trim valves to move said clutch configuration from said first fixed gear mode to said first EVT mode when said electrical operative connection said ECU is off.

3. A multi-mode hybrid transmission, as set forth in claim 1, wherein said HYD provides fluid to each of said shift valves and said trim valves to move said clutch configuration from said second fixed gear mode to said second EVT mode when said electrical operative connection said ECU is off.

4. A multi-mode hybrid transmission, as set forth in claim 1, wherein said HYD provides fluid to each of said shift valves and said trim valves to move said clutch configuration from said third fixed gear mode to said third EVT mode when said electrical operative connection said ECU is off.

5. A multi-mode hybrid transmission, as set forth in claim 1, wherein each of said trim valves and said shift valves includes a valve body and a valve member movable within said valve body between a stroked position and an unstroked position to selectively control the engagement of one more of said clutches.

6. A multi-mode hybrid transmission, as set forth in claim 5, wherein said first shift valve is in said unstroked position and said second shift valve is in said stroked position when said clutch configuration is operating in said first EVT mode.

7. A multi-mode hybrid transmission, as set forth in claim 5, wherein each of said first shift valve and said second shift valves are in said stroked position when said clutch configuration is operating in one of said first EVT mode, said first fixed gear mode, said second EVT mode, and said second fixed gear mode.

8. A multi-mode hybrid transmission, as set forth in claim 5, wherein said first shift valve is in said stroked position and said second shift valve is in said unstroked position when said clutch configuration is operating in one of said third EVT mode, said third fixed gear mode, and said fourth EVT mode.

9. A multi-mode hybrid transmission, as set forth in claim 5, wherein each of said first shift valve and said second shift valves are in said unstroked position when said clutch configuration is operating in said fourth EVT mode.

10. A multi-mode hybrid transmission, as set forth in claim 5, further comprising a plurality of solenoids;
wherein each of said plurality of solenoids are in electrical operative communication with a respective one of said plurality of shift valves and trim valves;
wherein each of said solenoids are configured to selectively move said respective valve members to one of said stroked position and said unstroked position in response to receiving an electrical signal.

11. A multi-mode hybrid transmission comprising:
an input member;
an output member;
at least one electric motor;
first, second, third and fourth clutches being engageable in response to fluid pressure, said clutches being engageable in various combinations to provide a first electronically variable transmission (EVT) mode, a second EVT mode, a third EVT mode, and a fourth EVT mode of operation in which the speed ratio between the input member and the output member is dependent upon the speed of said at least one electric motor and a first fixed gear mode, a second fixed gear mode, and a third fixed gear mode of operation in which the speed ratio between said input member and said output member is fixed;

a plurality of fluid passages;

first and second shift valves;

first, second, third, and fourth trim valves;

wherein each of said shift valves and said trim valves are configured to control fluid pressure to a respective one of said first, second, third, and fourth clutches via said plurality of fluid passages;

wherein each of said shift valves and said trim valves are configured to control fluid pressure to a respective one of said first, second, third, and fourth clutches;

wherein each of said trim valves and said shift valves includes a valve body and a valve member movable within said valve body between a stroked position and an unstroked position to selectively control the engagement of at least one of said clutches an electronic control unit (ECU) electrically operatively connected to each of said shift valves and said trim valves to selectively engage in combinations of at least two of said first, second, third, and fourth clutches and provide a clutch configuration to operate in at least one of said first EVT mode, said second EVT mode, said third EVT mode, said fourth EVT mode, said first fixed gear mode, said second fixed gear mode, and said third fixed gear mode;

wherein each of said first shift valve and said second shift valves is in said unstroked position when said clutch configuration is operating in said fourth EVT mode; and a hydraulic control unit (HYD);

wherein said HYD provides fluid to each of said shift valves and said trim valves via at least one of said plurality of fluid passages to maintain said clutch configuration in one of said EVT modes when said electrical operative connection to said ECU is off; and wherein said HYD provides fluid to each of said shift valves and said trim valves via at least one of said plurality of fluid passages to move said clutch configuration from said fixed gear mode to one of said EVT modes when said electrical operative connection to said ECU is off.

12. A multi-mode hybrid transmission, as set forth in claim 11, wherein said first shift valve is in said unstroked position and said second shift valve is in said stroked position when said clutch configuration is operating in said first EVT mode.

13. A multi-mode hybrid transmission, as set forth in claim 11, wherein each of said first shift valve and said second shift valves are in said stroked position when said clutch configuration is operating in one of said first EVT mode, said first fixed gear mode, said second EVT mode, and said second fixed gear mode.

14. A multi-mode hybrid transmission, as set forth in claim 11, wherein said first shift valve is in said stroked position and said second shift valve is in said unstroked position when said clutch configuration is operating in one of said third EVT mode, said third fixed gear mode, and said fourth EVT mode.

15. A multi-mode hybrid transmission, as set forth in claim 11, wherein each of said first shift valve and said second shift valves are in said unstroked position when said clutch configuration is operating in said fourth EVT mode.

16. A multi-mode hybrid transmission, as set forth in claim 11, further comprising a plurality of solenoids;

wherein each of said plurality of solenoids are in electrical operative communication with a respective one of said plurality of shift valves and trim valves;

wherein each of said solenoids are configured to selectively move said respective valve members to one of said stroked position and said unstroked position in response to receiving an electrical signal.

17. A multi-mode hybrid transmission comprising:

an input member operatively connected to said engine;

an output member operatively connected to said final drive;

at least one electric motor;

first, second, third and fourth clutches being engageable in response to fluid pressure, said clutches being engageable in various combinations to provide at least four electronically variable transmission (EVT) modes of operation in which the speed ratio between the input member and the output member is dependent upon the speed of said at least one electric motor and a plurality of fixed gear modes of operation in which the speed ratio between said input member and said output member is fixed; first and second shift valves, first, second, third, and fourth trim valves, a control system including;

an electronic control unit (ECU) configured to selectively engage in combinations of at least two of said first, second, third, and fourth clutches and provide a clutch configuration to operate in at least one of a first electronic variable transmission (EVT) mode, a second EVT mode, a third EVT mode, a fourth EVT mode, a first fixed gear mode, a second fixed gear mode, and a third fixed gear mode;

wherein said first clutch and said third clutch are engaged in said first EVT mode;

wherein said first clutch and said fourth clutch are engaged in said second EVT mode;

wherein said second clutch and said fourth clutch are engaged in said third EVT mode;

wherein said second clutch and said third clutch are engaged in said fourth EVT mode;

wherein said first clutch, said third clutch, and said fourth clutch are engaged in said first fixed gear mode;

wherein said first clutch, said second clutch, and said fourth clutch are engaged in said second fixed gear mode;

wherein said second clutch, said third clutch, and said fourth clutch are engaged in said third fixed gear mode; and a hydraulic control unit (HYD);

wherein said HYD provides fluid to maintain said clutch configuration in said EVT mode when said electrical operative connection to said ECU is of;

wherein said HYD provides fluid to move said clutch configuration from said fixed gear mode to said EVT mode when said electrical operative connection to said ECU is off.

18. A multi-mode hybrid transmission, as set forth in claim 17, further comprising:

a plurality of fluid passages; a first and second shift valves; and first, second, third, and fourth trim valves;

wherein each of said shift valves and said trim valves are configured to control fluid pressure to a respective one of said first, second, third, and fourth clutches;

wherein said ECU is electrically operatively connected to each of said shift valves and said trim valves to selectively engage a plurality of said clutches and provide a clutch configuration to operate in at least one of said first EVT mode, said second EVT mode, said third EVT mode, said fourth EVT mode, first fixed gear mode, said second fixed gear mode, and said third fixed gear mode.

19. A multi-mode hybrid transmission, as set forth in claim 18, wherein said HYD provides fluid to each of said shift valves and said trim valves via at least one of said plurality of fluid passages to maintain said clutch configuration in said EVT mode when said electrical operative connection to said ECU is off; and wherein said HYD provides fluid to each of said shift valves and said trim valves via at least one of said plurality of fluid passages to move said clutch configuration from said fixed gear mode to said EVT mode when said electrical operative connection to said ECU is off.

* * * * *